United States Patent
Watari et al.

[11] Patent Number: 6,154,197
[45] Date of Patent: *Nov. 28, 2000

[54] VIRTUAL IMAGE GENERATION METHOD AND ITS APPARATUS

[75] Inventors: Juro Watari; Yoshihiro Sonoda, both of Tokyo, Japan

[73] Assignee: Kabushiki Kaisha Sega Enterprises, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/817,243

[22] PCT Filed: Aug. 9, 1996

[86] PCT No.: PCT/JP96/02267

§ 371 Date: Jun. 26, 1997

§ 102(e) Date: Jun. 26, 1997

[87] PCT Pub. No.: WO97/06510

PCT Pub. Date: Feb. 20, 1997

[30] Foreign Application Priority Data

Aug. 10, 1995 [JP] Japan ................................. 7-204848

[51] Int. Cl.[7] .................................................. G09G 5/08
[52] U.S. Cl. ........................ 345/161; 463/38; 273/148 B
[58] Field of Search .............................. 348/7, 8, 9, 121, 348/139, 157, 158, 161, 156; 463/2, 6–8, 30–33, 36–38, 50; 434/69; 273/438, 148 B

[56] References Cited

U.S. PATENT DOCUMENTS 5,259,626 11/1993 Ho ............................................... 463/37
5,317,505 5/1994 Karabed et al. ........................... 463/37

FOREIGN PATENT DOCUMENTS

94/24685 10/1994 WIPO .

*Primary Examiner*—Regina Liang
*Attorney, Agent, or Firm*—Finnegan, Henderson, Farabow, Garrett & Dunner, L.L.P.

[57] ABSTRACT

The virtual image generation apparatus (1000) is a virtual image generation apparatus for a game unit or the like, and comprises a plurality of (for example, two) input means (11: control levers, joysticks, or the like) for generating codes associated with operating direction, decoding means (101: a CPU, controller, or the like) for inputting codes generated through operation of the plurality of input means and assigning a control profile for a movable object associated with a combination of a plurality of input codes, and image generation means (101, 108–117: a CPU, geometalyzer, graphic controller, or the like) for generating virtual images whereby the movable object control profiles assigned by the decoding means are reflected in relative motion of the movable objects within virtual space. The input device control attitude is detected digitally and corresponding movements are assigned, thereby eliminating unintended input and allowing movable objects to be freely controlled in three dimensions in a virtual space.

24 Claims, 8 Drawing Sheets

A VIEW OF ENTIRE INPUT DEVICE

SIDE VIEW OF INPUT DEVICE

FIG. 4

| CONTROL ATTITUDE RIGHT / LEFT | MOVEMENT | CONTROL ATTITUDE RIGHT / LEFT | MOVEMENT | CONTROL ATTITUDE RIGHT / LEFT | MOVEMENT |
|---|---|---|---|---|---|
| ←←← / ··· ↑↑↑ ↘↘↘ | CIRCLE FORWARD CLOCKWISE / CIRCLE FORWARD CLOCKWISE / CIRCLE FORWARD CLOCKWISE | ←←← / ← ↗ ↓ | FORWARD ADVANCE (2) / CIRCLE FORWARD CLOCKWISE / CIRCLE FORWARD CLOCKWISE | ←←← / ↖ → ↙ | ADVANCE DIAGONALLY SLIGHTLY TO RIGHT / ROTATE CLOCKWISE IN POSITION / ADVANCE DIAGONALLY SLIGHTLY TO LEFT |
| ↖↖↖ / ··· ↑↑↑ ↘↘↘ | CIRCLE FORWARD CLOCKWISE / SLOW CIRCLE CLOCKWISE TO RIGHT / ROTATE CLOCKWISE IN POSITION | ↖↖↖ / ← ↗ ↓ | BACK UP DIAGONALLY SLIGHTLY TO RIGHT / CIRCLE CLOCKWISE TO RIGHT / STOP | ↖↖↖ / ↖ → ↙ | ADVANCE DIAGONALLY TO RIGHT / BACK UP CLOCKWISE / FORWARD ADVANCE |
| ↑↑↑ / ··· ↑↑↑ ↘↘↘ | SLOW RIGHT ADVANCE / RIGHT ADVANCE / STOP | ↑↑↑ / ← ↗ ↓ | CIRCLE FORWARD COUNTERCLOCKWISE / SLOW CIRCLE CLOCKWISE TO RIGHT / STOP | ↑↑↑ / ↖ → ↙ | SLOW CIRCLE COUNTERCLOCKWISE TO RIGHT / BACK UP CLOCKWISE / STOP |
| ↗↗↗ / ··· ↑↑↑ ↘↘↘ | SLOW RIGHT ADVANCE / SLOW CIRCLE COUNTERCLOCKWISE TO RIGHT / BACK UP | ↗↗↗ / ← ↗ ↓ | CIRCLE FORWARD COUNTERCLOCKWISE / BACK UP DIAGONALLY SLIGHTLY TO RIGHT / STOP | ↗↗↗ / ↖ → ↙ | SLOW CIRCLE COUNTERCLOCKWISE TO RIGHT (1) / BACK UP DIAGONALLY SLIGHTLY TO RIGHT / ROTATE COUNTERCLOCKWISE IN POSITION |
| →→→ / ··· ↑↑↑ ↘↘↘ | CIRCLE COUNTERCLOCKWISE / CIRCLE COUNTERCLOCKWISE BACK / BACK UP DIAGONALLY SLIGHTLY TO LEFT | →→→ / ← ↗ ↓ | ROTATE COUNTERCLOCKWISE IN POSITION / BACK UP / BACK UP COUNTERCLOCKWISE | →→→ / ↖ → ↙ | BACK UP COUNTERCLOCKWISE / BACK UP / BACK UP COUNTERCLOCKWISE |
| ↘↘↘ / ··· ↑↑↑ ↘↘↘ | SLOW ADVANCE TO LEFT / JUMP / BACK UP DIAGONALLY TO LEFT | ↘↘↘ / ← ↗ ↓ | ROTATE COUNTERCLOCKWISE IN POSITION / BACK UP / SLOW CIRCLE COUNTERCLOCKWISE TO LEFT | ↘↘↘ / ↖ → ↙ | ROTATE COUNTERCLOCKWISE IN POSITION / BACK UP DIAGONALLY SLIGHTLY TO LEFT / CIRCLE COUNTERCLOCKWISE TO LEFT |
| ↓↓↓ / ··· ↑↑↑ ↘↘↘ | SLOW ADVANCE TO LEFT / JUMP (4) / SLOW CLOCKWISE CIRCLE TO LEFT | ↓↓↓ / ← ↗ ↓ | CIRCLE FORWARD COUNTERCLOCKWISE / JUMP / ADVANCE LEFT | ↓↓↓ / ↖ → ↙ | JUMP / BACK UP CLOCKWISE / SLOW CIRCLE COUNTERCLOCKWISE TO LEFT |
| ↙↙↙ / ··· ↑↑↑ ↘↘↘ | SLOW ADVANCE TO LEFT / JUMP / CIRCLE CLOCKWISE TO LEFT | ↙↙↙ / ← ↗ ↓ | ADVANCE DIAGONALLY SLIGHTLY TO LEFT (3) / ROTATE CLOCKWISE IN POSITION / SLOW CIRCLE CLOCKWISE TO LEFT | ↙↙↙ / ↖ → ↙ | FORWARD ADVANCE / RAPID BACKUP CLOCKWISE / ADVANCE DIAGONALLY TO LEFT |
| ··· / ··· ↑↑↑ ↘↘↘ | STOP / SLOW ADVANCE TO RIGHT / SLOW ADVANCE TO LEFT | ··· / ← ↗ ↓ | SLOW CIRCLE FORWARD COUNTERCLOCKWISE / SLOW ADVANCE TO RIGHT / SLOW ADVANCE TO LEFT | ··· / ↖ → ↙ | SLOW CIRCLE FORWARD COUNTERCLOCKWISE / BACK UP CLOCKWISE / SLOW ADVANCE TO LEFT |

SCENE 1: ILLUSTRATION OF PLAYER AND ENEMY POSITIONS
(VIEWED FROM ABOVE)

SCENE 1: ILLUSTRATION OF PLAYER AND ENEMY POSITIONS
(VIEWED FROM ABOVE)

VIRTUAL IMAGE DISPLAY
FOR SCENE 1

SCENE 1: ILLUSTRATION
OF PLAYER AND
ENEMY POSITIONS
(VIEWED FROM ABOVE)

SCENE 2: ILLUSTRATION OF PLAYER AND ENEMY
POSITIONS (VIEWED FROM ABOVE)

VIRTUAL IMAGE DISPLAY FOR SCENE 2

DRIVING GAME INPUT DEVICE

HELICOPTOR SIMULATOR INPUT DEVICE

VIRTUAL IMAGE GENERATION METHOD AND ITS APPARATUS

TECHNICAL FIELD

The present invention relates to a virtual image generation technique for use in game nits, simulators, and the like, and particularly to a technique for generating images (hereinafter termed "virtual images") obtained when an object present in a virtual three-dimensional space (hereinafter termed "virtual space") is projected (by perspective projection) onto a two-dimensional plane which corresponds to a prescribed visual point.

BACKGROUND ART

In recent years, game units and simulators equipped with on-board virtual image generation apparatuss which make it possible for movable objects (objects) which move through three-dimensional space to combat each other have been developed. Such virtual image generation apparatuss are usually equipped with a virtual image generation apparatus main unit that houses a computer unit for executing stored programs, an input device for sending control signals to the computer unit to instruct it to move objects displayed on the screen within the virtual image, a display for displaying the virtual images generated by the computer unit according to the program sequence, and a sound device for generating sounds according to the program sequence.

Examples of devices with the architecture described above include driving game unit with a car race theme, in which cars compete with enemy cars on a circuit, and simulators which re-create the experience of piloting a helicopter or airplane. In this type of device, highly realistic simulation of car or helicopter movement is extremely important. For example, in a driving game like that depicted in FIG. 8A, input devices which resemble an actual car steering wheel, accelerator pedal, and brake pedal are used. In a helicopter or other simulator input device are processed by the CPU (central processing unit) of the computer unit. The computer unit repeatedly performs calculations to assign relative position within the virtual space to the objects, including data for enemy object motion when enemy objects are also present As players become more skilled at playing games, it has become necessary to go beyond conventional motion and develop movable objects such as player-controlled robots, humans, and the like. Particularly in the field of game devices, games are being developed in which objects not only move in two dimensions over a terrain created in virtual space (hereinafter termed "virtual terrain"), but also jump up from a virtual terrain in order to jump over another character or engage in fights in midair.

However, input devices for conventional virtual image generation apparatuss, while suitable for controlling two-dimensional motion of objects through a virtual space, are not adapted to controlling three-dimensional motion such as jumping. For example, in the driving games mentioned earlier, the steering wheel (which is the principal means of control) controls the movable object in the sideways direction (as viewed from the player's visual point), while the accelerator and brake pedals control motion in the forward direction; there is no way to control motion of the movable object in the vertical direction. Similarly, in simulators, a single control lever is used to control all motion of the movable object in three directions, the forward direction, sideways direction, and vertical direction.

In combat-style game units, the game unit must afford control sufficient to permit agile motion in order to avoid an enemy attack. In such cases, a special control button or control lever to control jumping can be provided, but this makes operation complicated and does not allow the action to be transmitted to the game unit with the same sense of speed that the player desires. In addition, excessively feature-laden input devices entail higher costs.

By way of improving control a video game unit which affords simple game control using two control levers is taught in Japanese Laid-Open Patent Application 6-277363. In this example of the prior art, thrust vectors are assigned according to the control lever inclination of each of the two control levers, and the two vectors are synthesized to produce complex actions.

However, in this example of the prior art, it is difficult to move the object rapidly in the desired direction through synthesis of the two vectors, and it is not possible to move the object freely to a desired position in three-dimensional space.

In order to solve this problem, it is an object of the present invention to provide a virtual image generation method and device which allow a movable object to be moved freely and without input error in three dimensions within a virtual space, and to a device therefor.

SUMMARY OF THE INVENTION

In accordance with the invention there is provided a virtual image generation method for generating virtual images which include movable objects (robots, airplanes, and the like) that undergo relative motion within a virtually created virtual space (a so-called world coordinate system), comprising the steps of generating codes associated with the operating direction of a plurality of (for example, two) input means (control levers, joysticks, or the like), assigning control profiles for movable objects associated with the code combinations generated by the plurality of input means, and generating virtual images wherein the assigned control profiles are reflected in relative motion of the movable objects within virtual space.

In accordance with the invention there is provided a virtual image generation apparatus for generating virtual images which include movable objects that undergo relative motion within a virtually created virtual space, comprising a plurality of (for example, two) input means (control levers, joy sticks, or the like) for generating codes associated with operating direction, decoding means (a CPU, controller, or the like) for inputting the codes generated through operation of the plurality of input means, and assigning a control profile for a movable object associated with a combination of a plurality of input codes, and image generation means (a CPU, geometalyzer, graphic controller, or the like) for generating virtual images whereby the movable object control profiles assigned by the decoding means are reflected in relative motion of the movable objects within virtual space.

As for the aforementioned control profile, the decoding means, in the event that a combination of codes input from the input means matches a prescribed combination (for example, when the left input means is tilted to the left and the right input means is tilted to the right), assumes that the direction corresponding to the perpendicular direction with respect to a horizontal plane in the virtual space through which the movable object moves is the upward direction, whereupon the decoding means assigns a control profile such that the movable object moves upward, and the image generation means, in the event that the assigned control profile is such that the movable object is moved upward, generates a virtual image whereby the movable object moves upward from a horizontal plane in the virtual space.

As an alternative control profile, wherein the decoding means, in the event that a combination of codes input from the input means matches a prescribed combination (for example, when the left input means is moved forward and the right input means is lowered towards the player), assigns a control profile such that the movable object rotates while remaining in the same position within the virtual space, and the image generation means, in the event that the assigned control profile is such that the movable object is rotated, generates a virtual image whereby the movable object rotates while remaining in the same position within the virtual space.

As an alternative control profile, the decoding means, in the event that a combination of codes input from the input means matches a prescribed combination (for example, when the left input means is moved forward diagonally towards the right and the right input means is lowered towards the right), assigns a control profile such that the movable object moves in the lateral direction along a prescribed circle which is centered upon a prescribed central axis within the virtual space, and the image generation means, in the event that the assigned control profile is such that the movable object is moved in the lateral direction along said circle, generates a virtual image whereby the movable object moves in the lateral direction along said circle.

In a further aspect of the invention, the input means are control levers which generate a center position code when moved to a prescribed location and which generate a different code when moved in any of eight directions from the prescribed location.

Switch or control buttons that can detect a neutral position and eight directions may be substituted for the control levers.

In a further aspect of the invention, numerous code combinations are afforded by the control attitudes of the plurality of control means. By associating these various combinations with various motions of movable objects in virtual space, the movable objects can be induced to undergo complex motion. Therefore, the movement of a movable object can be clearly defined through selection of a given control attitude, and by perspective projection of the movable object, the virtual terrain, and the like with reference to this defined movement, virtual images adapted to game units, simulators, and the like can be generated.

Even under conditions where there is a high likelihood of unintended operation, such as when the player operates the input device in an intuitive fashion in order to dodge a bullet, assigning movable object movements in such a way that such movements approximate those movements which are presumably intended by the player reduces the likelihood of unintended operation, thereby reducing the demands placed upon the player. By assigning three dimensional movements, such as jumping by a movable object, in addition to two-dimensional movements, it becomes possible to move the movable object in three dimensions.

In a further aspect of the invention, movement in a direction corresponding to the perpendicular direction from a horizontal plane in a virtual space is assigned to a specific operation, thereby allowing the three-dimensional movement of a movable object to be controlled by means of a prescribed operation.

In a further aspect of the invention, rotation in a fixed position is assigned to a specific operation, thereby allowing the orientation of the movable object to be changed without changing its two dimensional position in a virtual space by means of a prescribed operation.

In a further aspect of the invention, orbit around a prescribed central axis is assigned to a specific operation, making possible actions such as orbiting around an enemy character by means of a prescribed operation.

In a further aspect of the invention, control levers are employed as the control means, and each control lever can maintain nine different control attitudes. Thus, the use of a plurality of control levers affords a number of combinations sufficient to allow control of complex movements by a movable object

BRIEF DESCRIPTION OF THE DRAWINGS

FIG. 4 is an assignment diagram showing the control attitudes of the left and right, control levers and the associated movements of a movable object in the embodiment;

BEST MODE FOR CARRYING OUT THE INVENTION

Favorable embodiments of the present invention will be described below with reference to the drawings.

(1) Description of Structure

Figure 1:
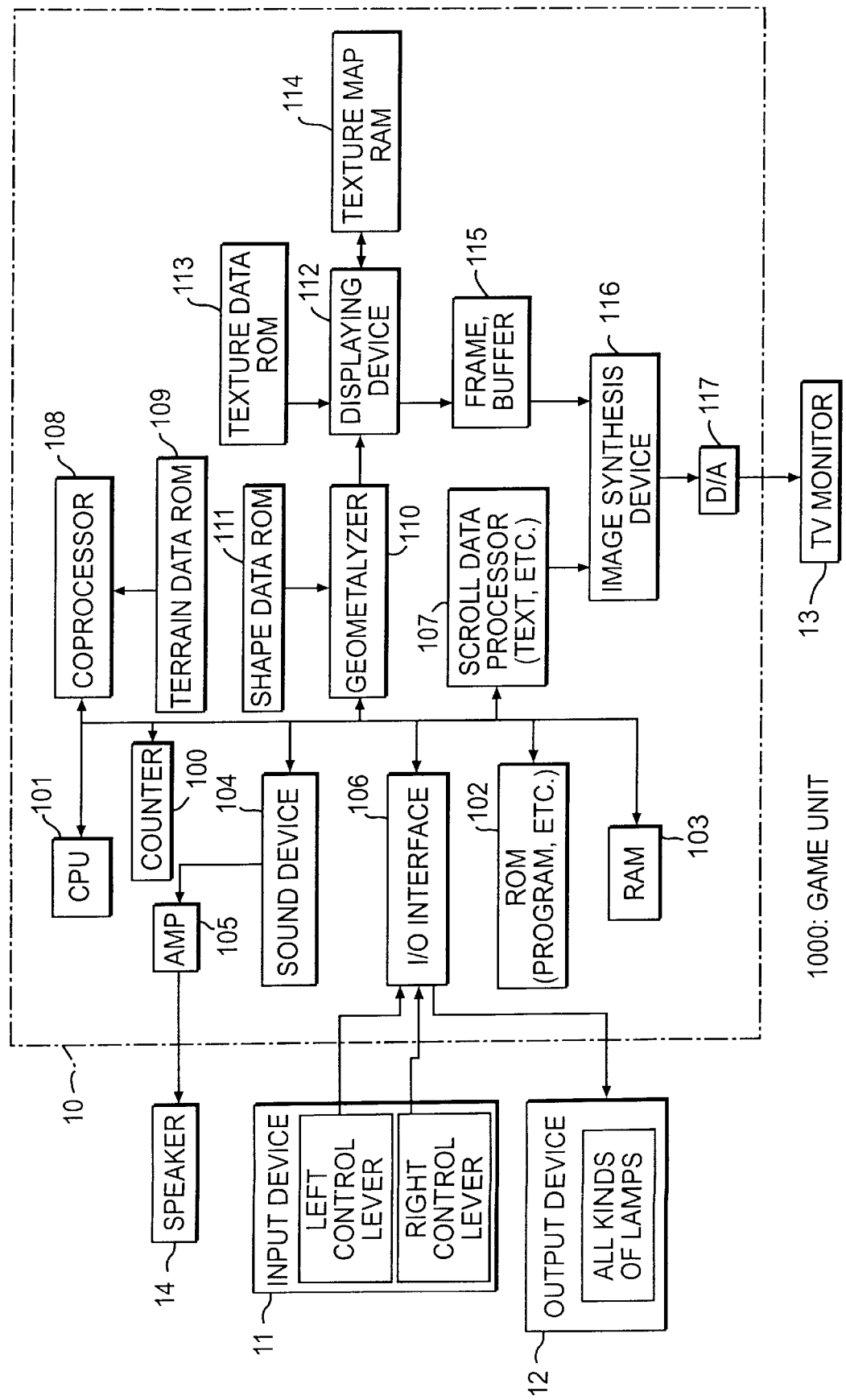
FIG. 1 is a simplified block diagram of a game unit pertaining to an embodiment of the present invention.

A structural diagram of a game unit which represents one embodiment of the present invention is presented in FIG. 1. In this embodiment, a robot serves as the movable object. Controlled by the player, the robot moves freely within the virtual space, engaging in combat with enemy robots.

As shown in FIG. 1, the game unit 1000 comprises the following basic structural elements: a game unit main body 10, an input device 11, an output device 12, a TV monitor 13, and a speaker 14.

The input device 11 is provided with control levers which are operated with the player's left and right hands in order to control the movement of the robot. The output device 12 is provided with various types of lamps which notify the player of the operational status of the unit The TV monitor 13 displays the combat game image; a head mounted display (HMD), projector, or the like may be used in place of a TV monitor.

As image generation means, the game unit main body 10 has a counter 100 and a CPU (central processing unit) 101; it is also equipped with ROM 102, RAM 103, a sound device 104, an I/O interface 106, a scroll data processor 107, a coprocessor 108, terrain data ROM 109, a geometalyzer 110, shape data ROM 111, a displaying device 112, texture data ROM 113, texture map RAM 114, a frame buffer 115, an image synthesis device 116, and a D/A converter 117. The game unit main body 10 generates new virtual images at prescribed intervals (for example, each ⅟₆₀th of a second, corresponding to the vertical sync cycle of the television format).

The CPU 101, which serves as the decoding means, is connected via buslines to the counter 100, which stores initial values, to the ROM 102, which stores the program for the game sequence and image generation, to the RAM 103, which stores temporary data, and to the sound card 104, I/O interface 106, scroll data processor 107, coprocessor 108, and geometalyzer 110.

The RAM 103 temporarily stores data required for polygon data coordinate conversion and other functions, and stores various commands for the geometalyzer (such as object display commands), the results of matrix operations during conversion process operations, and other data.

When the player enters control signals through the input device 11, the I/O interface 106 issues interrupt requests to the CPU 101; when the CPU 101 sends data for lamp display, this data is sent to the output device 12.

The sound card 104 is connected to a speaker 14 through a power amplifier 105. Audio signals output by the sound card 104 are amplified by the power amplifier 105 and delivered to the speaker 14.

The ROM 111 stores the polygon data required to generate virtual images of various physical objects such as the player's robot, enemy robots, bomb explosion images, and elements of the virtual terrain such as obstacles, background, and topographical features.

The ROM 109 stores shape data for physical objects (buildings, obstacles, topographical features, and the like) concerning which it is necessary to make overlap decisions, i.e., whether an object should collide with another topographical feature, or be hidden by a topographical feature. In contrast to the relatively detailed polygon data groupings for image display stored in the ROM 111, the data groupings stored in the ROM 109 comprise rough units sufficient to perform overlap decisions and the like. For example, topographical feature data might include an ID for each surface which defines a topographical feature, and what is termed relationship of this ID and topographical feature surface is put in table form and stored in the ROM 111.

What is termed polygon data are data groupings which are sets comprising a plurality of apices, and which indicate the apices of polygons (usually triangles or quadrangles), the elements that make up the shape of a physical object, as relative coordinates or absolute coordinates.

In order to generate virtual images, a coordinate system (world coordinate system) which indicates the relative positions of objects, obstacles, and other physical objects in a virtual space, must be converted to a two-dimensional coordinate system (visual point coordinate system) which represents the virtual space viewed from a designated visual point (for example, a camera or the like). The visual point is set at some prescribed position (for example, diagonally above the object) from which the object to be controlled is visible. Thus, the visual point coordinates change in accordance with the object coordinates. The object coordinates are sent as control signals from the input device 11 to the CPU 101.

Figure 2A:
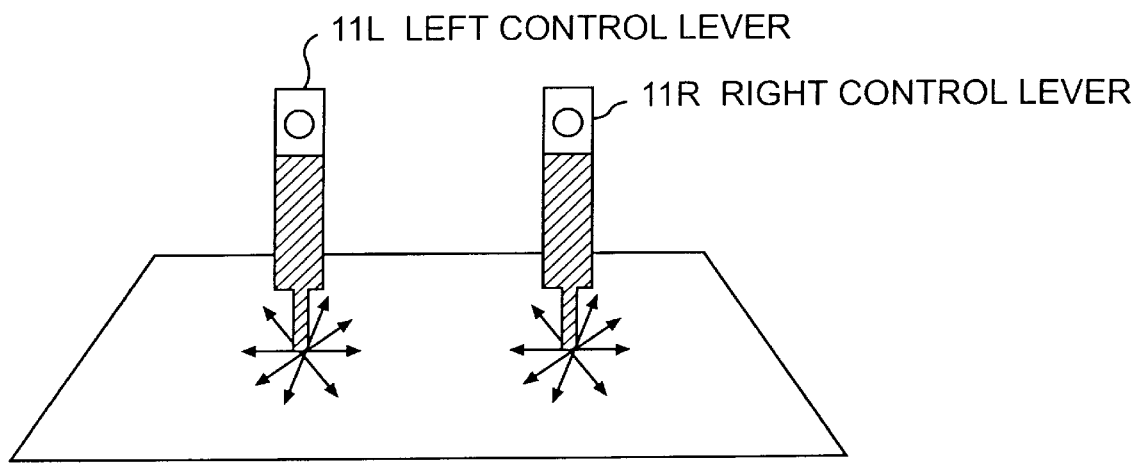
FIGS. 2A and 2B are illustrative diagram of input devices (control levers) pertaining to the embodiment.
Figure 2B:
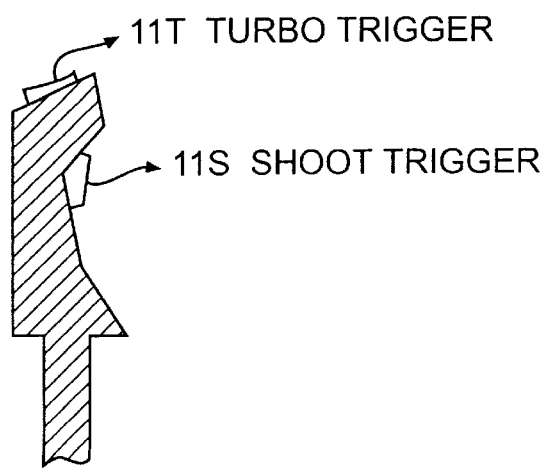
Figure 3:
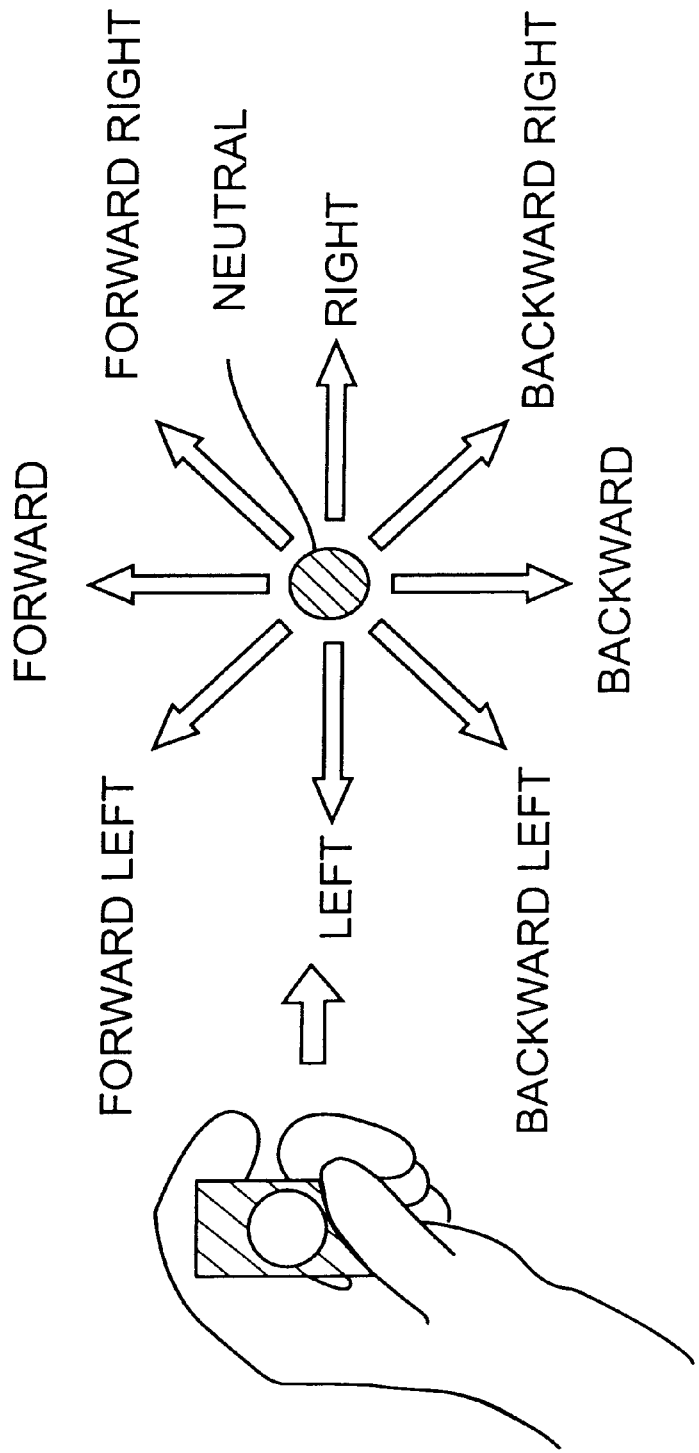
FIG. 3 is an illustrative diagram of the control lever operation method.

The entire input device 11 is depicted in FIG. 2A. As may be discerned from the drawing, the input device 11 comprises a left control lever 11L operated with the player's left hand and a right control lever 11R operated with the right hand. Each control lever has a total of nine control attitudes, forward and back, left and right, diagonal, and neutral (see FIG. 3). Control signals which correspond to the various control attitudes are output as digital signal codes. As shown in FIG. 2B, the control levers are equipped with shot triggers 11S and turbo triggers 11T for acceleration; codes are output when these are depressed.

FIG. 4 shows the object movement assignments for the control attitudes. Since each control lever has nine codes, simultaneous operation of both the left and right control levers gives a total of 81 possible combinations (=9 possibilities×9 possibilities). If a direction of motion of an object which is to be moved at the next interval is assigned to each combination, a total of 81 actions can be specified using two control levers.

Assignments should be made in such a way that the direction of motion of the actual object reflects as closely as possible the direction in which the player intuitively tries to move the movable object. However, since horizontal movement on the true horizontal, movement in a diagonal direction, and rotating, as well as jumping in the perpendicular direction from a horizontal plane in virtual space (the z-direction in the world coordinate system) are performed, these special actions should be assigned to prescribed control attitudes.

When the player is attacked by enemies, he or she moves the control levers to instinctively dodge enemy bullets in order to avoid the attack. With the control lever assignments in this embodiment, movement assignments are made in such a way that the movements intended by the player are reflected in the movements of the object, even for those actions which the player performs reflexively.

Once one of the code combinations indicated in FIG. 4 has been input from the input device 11, the CPU 101, following the program assigned in the manner indicated in FIG. 4, generates the visual point coordinates and object coordinates for the next interval. Once these coordinates have been set, the CPU 101 makes collision determinations and overlap determinations for the physical objects.

Objects, obstacles, and other physical objects are composed of a plurality of polygon data. For each physical object, a certain apex of a polygon which is an element of the physical object is selected as the origin, the entire shape is decided using a coordinate system which indicates the coordinates of the other apices (body coordinate system), and the data for polygons which make up the physical object is associated. In order to enable display of an explosion image when an object or obstacle is hit by a bullet or light ray, it is necessary to compute the relative positions of the physical objects and determine whether the physical objects have collided. To obtain relative position for a physical object represented by body coordinates, conversion to the prescribed coordinate system which makes up the virtual space (world coordinate system) must be made. Once the relative position for each physical object has been determined, it becomes possible to determine whether the physical objects collide with each other.

In order to enable show-through display of an obstacle when, from the visual point from which a virtual space is observed, an object or the like passes behind the obstacle, it is necessary to perform a determination of overlap status for the physical objects. To do this, the physical objects in the virtual space are converted to the coordinate system for viewing from the visual point, and a relative vector for the obstacle and object and a line-of-sight vector for the object and visual point are calculated. Once the angles of the two vectors have been computed, it can be determined whether the object should be hidden by obstacle or not. Since these computations entail coordinate conversion, matrix operations which include floating decimal point operations are required. Matrix operations are performed as by the coprocessor 108 making reference to terrain data and the like stored in ROM 109; as a result of the operations, the CPU 101 makes a collision determination or overlap determination.

A further requirement for image display is that physical objects in a virtual space be projected onto a two-dimensional plane which constitutes the field of vision in a manner similar to physical objects present in a virtual space observed from a given visual point (for example, camera photography). This is termed perspective projection, and the coordinate conversion performed through matrix operations for perspective projection is termed perspective conversion. It is the geometalyzer 110 that executes perspective conversion to produce the virtual image which is actually displayed.

The geometalyzer 110 is connected to the shape data ROM 111 and the displaying device 112. The geometalyzer 110 is provided by the CPU 101 with data indicating the data required for perspective conversion as well as with the matrix data required for perspective conversion. On the basis of the matrix provided by the CPU 101, the geometalyzer 110 performs perspective conversion on polygon data stored in the shape data ROM 111 to produce data converted from the three-dimensional coordinate system in virtual space to the field-of-vision coordinate system. At this time, if it is necessary to display an explosion image as a result of a collision determination by the CPU 101, polygon data for the explosion image is used.

The displaying device 112 applies texture to the converted field-of-vision coordinate system shape data and outputs the result to the frame buffer 115. If, as a result of an overlap determination, the object or the like is to be hidden behind an obstacle, a prescribed show-through display (mesh treatment or translucent treatment) is performed. To apply textures, the displaying device 112 is connected to the texture data ROM 113 and the texture map RAM 114, and is also connected to the frame buffer 115.

The scroll data processor 107 computes text and other scroll screen data (stored in ROM 102). The image synthesis device 116 imposes text data output from the processor 107 onto the image data provided by the aforementioned frame buffer 115 and resynthesizes the image. The re-synthesized image data is output to the TV monitor 13 through the D/A converter 117.

(II) Description of Operation

Figure 5:
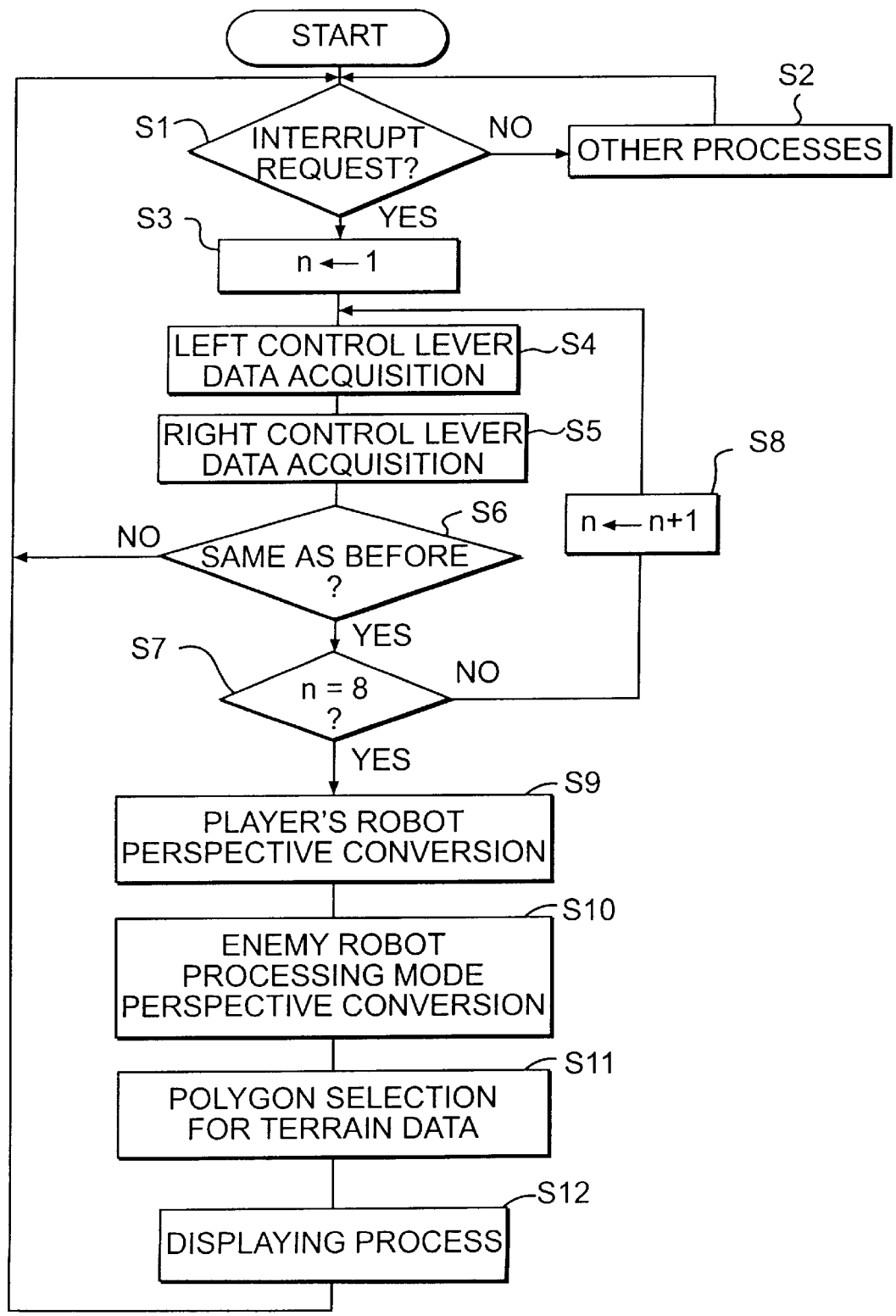
FIG. 5 is a flow chart illustrating the operation of the game unit pertaining to the embodiment.

Next, the operation in this embodiment will be described referring to the flow chart in FIG. 5.

When the player moves the left control lever 11L, the right control lever, or both, thereby inputting a new control signal to the I/O interface 106, the I/O interface 106 makes an interrupt request to the CPU 101. If there is no interrupt (step S1: NO), the CPU performs other processes (step S2), but if an interrupt request has been made, (step S1: YES), the control signal is acquired.

In this embodiment, in order to determine a way of doing unintended input or not the control signal is ascertained for each interval after an interrupt request, and if the same input signal is input eight consecutive times, a determination of correct input is made. To do this, the counter is first set to the initial value n (step S3) and the left control lever control signal and right control lever control signal are input (step S4, S5).

The CPU 101 compares the value of the control signal input during the previous interval with the currently input control signal value (step S6). If the two do not match (step S6: NO), a determination of unintended input is made, and the CPU awaits the next interrupt request (step 1). If the previous control signal value and the currently input control signal value are equal (step S6: YES), the CPU determines whether the same determination has been made eight times (step S7). If less than eight times (step S7: NO), the counter n is incremented (step S8) and the same procedure is repeated (steps S4–S7). If the same value has been input eight times (step S7: YES), the system proceeds to generate a virtual image on the basis of the correct control signal.

In step S9, on the basis of the coordinates of the destination point of the player's robot (object), the CPU 101 creates a perspective conversion matrix, a matrix for perspective conversion of shape data in virtual space into the visual point coordinate system, and provides this to the geometalyzer 110. At the same time, the CPU 101 provides the coprocessor 108 with the terrain data stored in ROM 109 and instructs the coprocessor to perform coordinate conversion for making a collision determination; if a "collision" result is produced, data indicating the necessary polygons is output to the geometalyzer 110. Where vector operations for making an overlap determination have produced an overlap result, the CPU 101 instructs the geometalyzer 110 to produce show-through display.

In step S10, processing similar to that described in step S9 is performed for the enemy robot The enemy robot can be made to move in accordance with the program stored in ROM 102, or made to move by another input device controlled by another player.

In step S11, the data required to designate polygons required for perspective conversion is provided to the geometalyzer 110.

In step S12, the geometalyzer 110 uses the provided perspective conversion matrix to perform perspective conversion for the designated shape data and supplies the result to the displaying device 112. The displaying device 112 performs texture application and the like for the perspective-converted polygons and outputs the result to the frame buffer 115.

With the embodiment described above, the control levers output control signals which take the form of digital data, thereby minimizing the likelihood of unintended input. Since movable object movement assignments are made in such a way that objects can be moved correctly, control is facilitated, even in scenes where it is easy to make unintended moves. Special assignments are made for control attitudes which the player is thought unlikely to actually use, such as jumping, rotating, circling an enemy, rapid acceleration, and rapid stop, thereby allowing objects to be moved freely in three dimensions within a virtual space.

(III) Other Embodiments

The present invention is not limited to the embodiment described above and may be adapted in various ways.

For example, the input device was equipped with two control levers in the foregoing embodiment, but the present invention may be adapted to any configuration which outputs digital control signals, such as a joystick or control button that can be depressed in eight directions. The number of control directions is not limited to eight; implementation with more or fewer directions is possible.

Control attitude assignments are not limited to the assignments indicated in FIG. 4 and permit of various modifications in accordance with the specifications of the game unit, simulator, or other unit equipped with the image generating device which pertains to the present invention.

As the present invention was designed with the principal aim of facilitating control of movable objects in virtual space, the virtual image generation method may employ various image generation methods pertaining to computer graphics.

EXAMPLES

An example in which the game unit 1000 in the aforementioned embodiment of the invention is actually used will be described.

FIG. 6 depicts example 1 (scene 1), illustrating moves to evade a bullet fired by a combat partner (enemy).

Figure 6A:
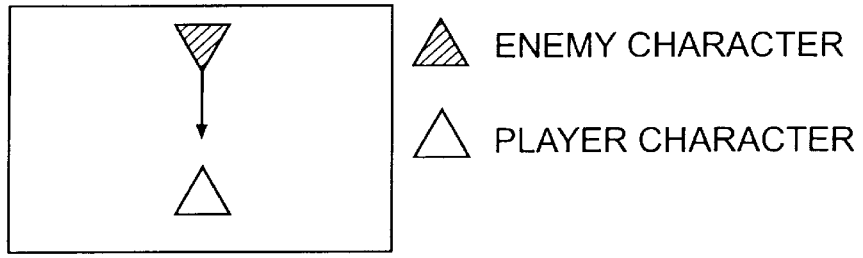
FIGS. 6A–6D are diagrams which illustrates embodiment 1.
Figure 6B:
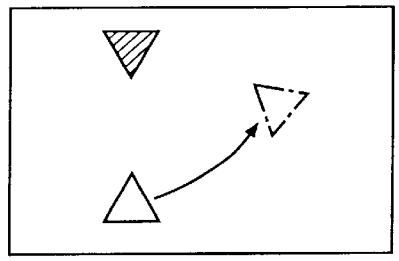
Figure 6C:
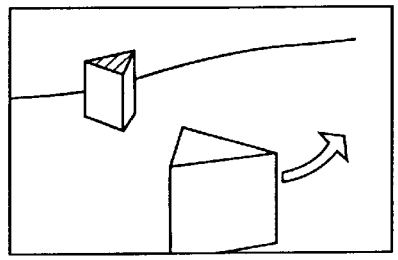
Figure 6D:
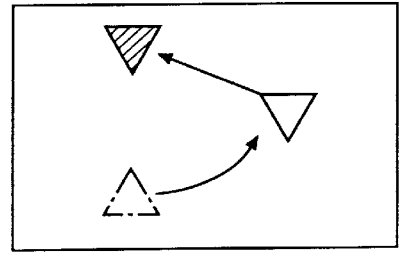

A of the same figure depicts positional relationships at the instant the bullet is fired by the enemy; positions are viewed from above. As in the previous embodiment the player manipulates the control levers in the manner shown in FIG. 4(1) to evade the bullet If control lever assignments have been made in the manner indicated in FIG. 4, the player's object performs a "slow circle counterclockwise to right". As shown in FIG. 6B, the player's object moves so as to circle the enemy. Scene 1, when actually displayed as a virtual image on a monitor, would appear as shown in C of the same figure. Since the visual point of the virtual image rotates with the movement of the player's object, the enemy's displayed position is virtually unchanged as the movement of the player's object to circle the enemy is displayed. This image display minimizes movement of the player's line of sight, reducing the demands placed on the player and allowing the excitement of real combat to be sustained.

As shown in D of the same figure, to advance the player's object forward after circling the enemy in order to counterattack, the player should lower both control levers in the forward direction (FIG. 4(2)). To perform both rapid circling and forward advance within a short time, the player can on occasion lower the control levers in the manner depicted in FIG. 4(3).

However, with the assignments indicated in FIG. 4, such frequently used control attitudes are reflected in the object as movements intended by the player, so the player's object can be advanced toward the enemy. That is, when objects are controlled through a synthesis vector for two levers, as described in the Background Art, the operation indicated in FIG. 4(3) can easily give rise to an unintended move; in this example, however, the operation indicated in FIG. 4(3) has the assignment "advance diagonally slightly to left", thereby allowing the object to be moved in the intended direction without slowing the pace of the game sequence.

Figure 7A:
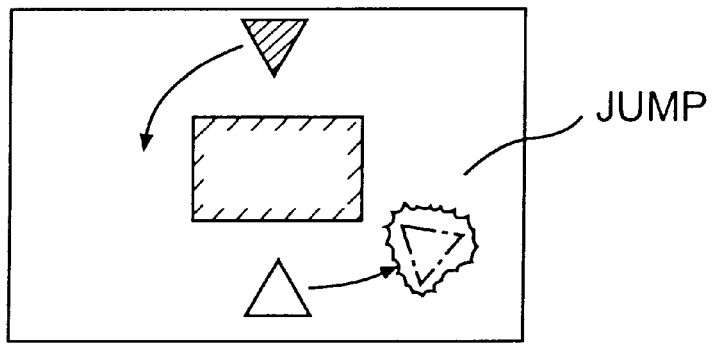
FIGS. 7A and 7B are diagrams which illustrates embodiment 2.

FIG. 7 depicts example 2 (scene 2), illustrating an enemy and the player's object circling each other around an obstacle.

A of the same figure shows the positional relationship of the enemy and the player's object. If only two dimensional movements within the virtual space can be specified, as with conventional game units, only movement around the same obstacle around which the two are trying to circle is possible, thereby slowing the pace.

Figure 7B:
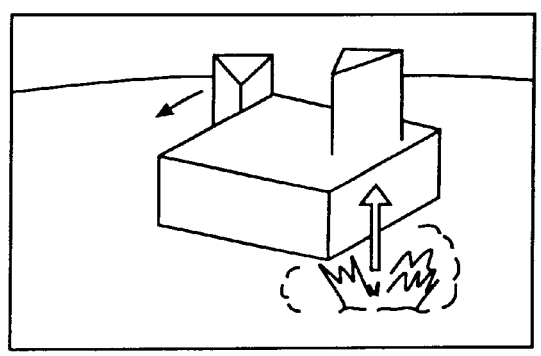
Figure 8A:
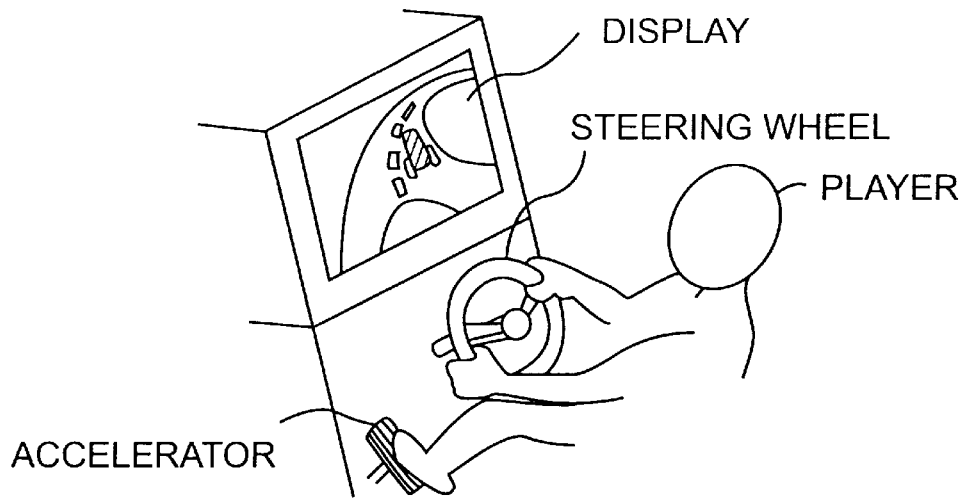
FIGS. 8A and 8B are diagrams depicting an input device for a conventional virtual image generation apparatus.
Figure 8B:
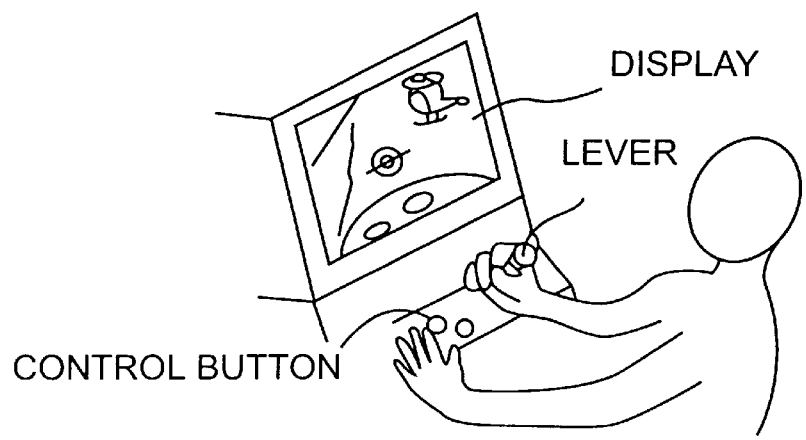

With this example, the player's object can be made to "jump" as it circles, as shown in FIG. 4(4), thereby allowing the player's object to jump down on the enemy from above and attack the enemy, as shown in the actual virtual image in FIG. 7B. By making a "forward advance" control move after making the "jump" control move, the player's object can be moved toward the enemy while maintaining the same altitude. This affords a fastpaced game sequence without complicated control moves.

INDUSTRIAL APPLICABILITY

In accordance with the present invention, a plurality of input device control attitudes are combined, and a specific movement is specified for each control attitude. This reduces the likelihood of unintended moves and facilitates control, thereby making it possible to freely control movable objects within virtual space.

For selected control attitudes, three-dimensional movement may be facilitated by assigning a jump move, rotation of a movable object may be facilitated by assigning a rotating move, and motion on a circle around a prescribed axis may assigned to facilitate circling around an enemy.

What is claimed is:

1. A virtual image generation method for generating virtual images of movable objects that move in virtual space, comprising the steps of:

acquiring, from each of a plurality of input devices which are movable in a plurality of predetermined directions that coincide with an operator's instinctive sense, operational direction signals from the respective input devices which correspond to control attitude, reading out, from memory means for storing predetermined various behaviors of said movable objects which have been coincided with combinations of operational direction signals of the input devices that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combination, is stored as said various behavior;

controlling the behaviors of said movable objects in accordance with the behaviors of said movable objects which have been so read out; and generating virtual images that reflect the result of control of the behaviors of said movable objects, wherein said memory means stores behaviors of said movable objects in the horizontal plane in said virtual space which have been associated with combinations of the signals that can be output by said plurality of input devices, as well as behaviors of said movable objects in the perpendicular direction.

2. A virtual image generation method for generating virtual images of movable objects that move in virtual space, comprising the steps of:

acquiring, from each of a plurality of input devices which are movable in a plurality of predetermined directions that coincide with an operator's instinctive sense, operational direction signals from the respective input devices which correspond to control attitude, reading out, from memory means for storing predetermined various behaviors of said movable objects which have been coincided with combinations of operational direction signals of the input devices that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combination, is stored as said various behavior;

controlling the behaviors of said movable objects in accordance with the behaviors of said movable objects which have been so read out; and generating virtual images that reflect the result of control of the behaviors of said movable objects, wherein said memory means stores behaviors specifying movement of said movable objects in the vertical direction in said virtual space when said plurality of input devices are in a prescribed control attitude.

3. A virtual image generation method for generating virtual images of movable objects that move in virtual space, comprising the steps of:

acquiring, from each of a plurality of input devices which are movable in a plurality of predetermined directions that coincide with an operator's instinctive sense, operational direction signals from the respective input devices which correspond to control attitude, reading out, from memory means for storing predetermined various behaviors of said movable objects which have been coincided with combinations of operational direction signals of the input devices that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combination, is stored as said various behavior;

controlling the behaviors of said movable objects in accordance with the behaviors of said movable objects which have been so read out; and generating virtual images that reflect the result of control of the behaviors of said movable objects, wherein said memory means stores behaviors specifying breaking said movable objects when said plurality of input devices are in a prescribed control attitude.

4. A virtual image generation method for generating virtual images of movable objects that move in virtual space, comprising the steps of:

acquiring, from each of a plurality of input devices which are movable in a plurality of predetermined directions that coincide with an operator's instinctive sense, operational direction signals from the respective input devices which correspond to control attitude, reading out, from memory means for storing predetermined various behaviors of said movable objects which have been coincided with combinations of operational direction signals of the input devices that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combination, is stored as said various behavior;

controlling the behaviors of said movable objects in accordance with the behaviors of said movable objects which have been so read out; and generating virtual images that reflect the result of control of the behaviors of said movable objects, wherein the step of reading out behaviors of said movable objects in accordance with the signal combinations that have been acquired from said plurality of input devices is performed when the same signal combination from the input devices is input a plurality of times.

5. A virtual image generation apparatus for generating virtual images of movable objects that move in virtual space, comprising:

a plurality of input means, which are movable in a plurality of predetermined directions that coincide with an operator's instinctive sense;

memory means for storing predetermined various behaviors of said movable objects which have been coincided with combinations of operational direction signals of the input devices that can be simultaneously output by said plurality of input devices, wherein at least one behavior which moves in a different direction than that of the synthesis of the operational directions, included in the assigned combination, is stored as said various behavior;

control means for reading out from said memory means behaviors of said movable objects that have been correlated with combinations of signals simultaneously output from said plurality of input devices in accordance with control attitude, and controlling the behaviors of said movable objects on the basis of said behaviors so read out; and image generation means for generating virtual images which reflect the result of control of the behaviors of said movable objects, wherein said memory means stores behaviors of said movable objects in the horizontal plane in said virtual space which have been associated with combinations of the signals that can be output by said plurality of input devices, as well as behaviors of said movable objects in the perpendicular direction.

6. A virtual image generation apparatus for generating virtual images of movable objects that move in virtual space, comprising:

a plurality of input means, which are movable in a plurality of predetermined directions that coincide with an operator's instinctive sense;

memory means for storing predetermined various behaviors of said movable objects which have been coincided with combinations of operational direction signals of the input devices that can be simultaneously output by said plurality of input devices, wherein at least one behavior which moves in a different direction than that of the synthesis of the operational directions, included in the assigned combination, is stored as said various behavior, control means for reading out from said memory means behaviors of said movable objects that have been correlated with combinations of signals simultaneously output from said plurality of input devices in accordance with control attitude, and controlling the behaviors of said movable objects on the basis of said behaviors so read out; and image generation means for generating virtual images which reflect the result of control of the behaviors of said movable objects, wherein said memory means stores behaviors specifying movement of said movable objects in the vertical direction in said virtual space when said plurality of input devices are in a prescribed control attitude.

7. A virtual image generation apparatus for generating virtual images of movable objects that move in virtual space, comprising:

a plurality of input means, which are movable in a plurality of predetermined directions that coincide with an operator's instinctive sense;

memory means for storing predetermined various behaviors of said movable objects which have been coincided with combinations of operational direction signals of the input devices that can be simultaneously output by said plurality of input devices, wherein at least one behavior which moves in a different direction than that of the synthesis of the operational directions, included in the assigned combination, is stored as said various behavior;

control means for reading out from said memory means behaviors of said movable objects that have been correlated with combinations of signals simultaneously output from said plurality of input devices in accordance with control attitude, and controlling the behaviors of said movable objects on the basis of said behaviors so read out; and image generation means for generating virtual images which reflect the result of control of the behaviors of said movable objects, wherein said memory means stores behaviors specifying breaking said movable objects when said plurality of input devices are in a prescribed control attitude.

8. A virtual image generation apparatus for generating virtual images of movable objects that move in virtual space, comprising:

a plurality of input means, which are movable in a plurality of predetermined directions that coincide with an operator's instinctive sense;

memory means for storing predetermined various behaviors of said movable objects which have been coincided with combinations of operational direction signals of the input devices that can be simultaneously output by said plurality of input devices, wherein at least one behavior which moves in a different direction than that of the synthesis of the operational directions, included in the assigned combination, is stored as said various behavior;

control means for reading out from said memory means behaviors of said movable objects that have been correlated with combinations of signals simultaneously output from said plurality of input devices in accordance with control attitude, and controlling the behaviors of said movable objects on the basis of said behaviors so read out; and image generation means for generating virtual images which reflect the result of control of the behaviors of said movable objects, wherein said control means reads out behaviors of said movable objects in accordance with the signal combinations that have been acquired from said plurality of input devices when the same signal combination from the input devices is input a plurality of times.

9. A movable object behavior control method for controlling the behavior of movable objects which move through virtual space, comprising the steps of:

acquiring, from each of a plurality of input devices which are movable in a plurality of predetermined directions that coincide with an operator's instinctive sense, operational direction signals from the respective input devices which correspond to control attitude;

reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and controlling the behaviors of said movable objects in accordance with the behaviors of said movable objects which have been so read out wherein said memory means stores behaviors of said movable objects in the horizontal plane in said virtual space which have been associated with combinations of the signals that can be output by said plurality of input devices, as well as behaviors of said movable objects in the perpendicular direction.

10. A movable object behavior control method for controlling the behavior of movable objects which move through virtual space, comprising the steps of:

acquiring, from each of a plurality of input devices which are movable in a plurality of predetermined directions that coincide with an operator's instinctive sense, operational direction signals from the respective input devices which correspond to control attitude;

reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and controlling the behaviors of said movable objects in accordance with the behaviors of said movable objects which have been so read out, wherein said memory means stores behaviors specifying movement of said movable objects in the vertical direction in said virtual space when said plurality of input devices are in a prescribed control attitude.

11. A movable object behavior control method for controlling the behavior of movable objects which move through virtual space, comprising the steps of:

acquiring, from each of a plurality of input devices which are movable in a plurality of predetermined directions that coincide with an operator's instinctive sense, operational direction signals from the respective input devices which correspond to control attitude;

reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and controlling the behaviors of said movable objects in accordance with the behaviors of said movable objects which have been so read out, wherein said memory means stores behaviors specifying breaking said movable objects when said plurality of input devices are in a prescribed control attitude.

12. A movable object behavior control method for controlling the behavior of movable objects which move through virtual space, comprising the steps of:

acquiring, from each of a plurality of input devices which are movable in a plurality of predetermined directions that coincide with an operator's instinctive sense, operational direction signals from the respective input devices which correspond to control attitude;

reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and controlling the behaviors of said movable objects in accordance with the behaviors of said movable objects which have been so read out, wherein the step of reading out behaviors of said movable objects in accordance with the signal combinations that have been acquired from said plurality of input devices is performed when the same signal combination from the input devices is input a plurality of times.

13. A behavior control device for controlling the behavior of movable objects through virtual space, comprising:

a plurality of input means, which are movable in a plurality of predetermined directions that coincide with an operator's instinctive sense;

memory means for storing predetermined various behaviors of said movable objects which have been coincided with combinations of operational directions of the input device that can be simultaneously output by said plurality of input devices, wherein at least one behavior which moves in a different direction than that of the synthesis of the operational directions, included in the assigned combination, is stored as said various behavior; and control means for reading out from said memory means behaviors of said movable objects that have been correlated with combinations of signals simultaneously output from said plurality of input devices in accordance with control attitude, and controlling the behaviors of said movable objects on the basis of said behaviors so read out, wherein said memory means stores behaviors of said movable objects in the horizontal plane in said virtual space which have been associated with combinations of the signals that can be output by said plurality of input devices, as well as behaviors of said movable objects in the perpendicular direction.

14. A behavior control device for controlling the behavior of movable objects through virtual space, comprising:

a plurality of input means, which are movable in a plurality of predetermined directions that coincide with an operator's instinctive sense;

memory means for storing predetermined various behaviors of said movable objects which have been coincided with combinations of operational directions of the input device that can be simultaneously output by said plurality of input devices, wherein at least one behavior which moves in a different direction than that of the synthesis of the operational directions, included in the assigned combination, is stored as said various behavior; and control means for reading out from said memory means behaviors of said movable objects that have been correlated with combinations of signals simultaneously output from said plurality of input devices in accordance with control attitude, and controlling the behaviors of said movable objects on the basis of said behaviors so read out, wherein said memory means stores behaviors specifying movement of said movable objects in the vertical direction in said virtual space when said plurality of input devices are in a prescribed control attitude.

15. A behavior control device for controlling the behavior of movable objects through virtual space, comprising:

a plurality of input means which are movable in a plurality of predetermined directions that coincide with an operators instinctive sense;

memory means for storing predetermined various behaviors of said movable objects which have been coincided with combinations of operational directions of the input device that can be simultaneously output by said plurality of input devices, wherein at least one behavior which moves in a different direction than that of the synthesis of the operational directions, included in the assigned combination, is stored as said various behavior; and control means for reading out from said memory means behaviors of said movable objects that have been correlated with combinations of signals simultaneously output from said plurality of input devices in accordance with control attitude, and controlling the behaviors of said movable objects on the basis of said behaviors so read out, wherein said memory means stores behaviors specifying breaking said movable objects when said plurality of input devices are in a prescribed control attitude.

16. A behavior control device for controlling the behavior of movable objects through virtual space, comprising:

a plurality of input means, which are movable in a plurality of predetermined directions that coincide with an operator's instinctive sense;

memory means for storing predetermined various behaviors of said movable objects which have been coincided with combinations of operational directions of the input device that can be simultaneously output by said plurality of input devices, wherein at least one behavior which moves in a different direction than that of the synthesis of the operational directions, included in the assigned combination, is stored as said various behavior; and control means for reading out from said memory means behaviors of said movable objects that have been correlated with combinations of signals simultaneously output from said plurality of input devices in accordance with control attitude, and controlling the behaviors of said movable objects on the basis of said behaviors so read out, wherein said control means reads out behaviors of said movable objects in accordance with the signal combinations that have been acquired from said plurality of input devices, when the same signal combination from the input devices is input a plurality of times.

17. A machine-readable memory medium that stores a virtual image generation program for generating virtual images of moveable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior;

memory module for controlling the behaviors of said movable objects in accordance with the behaviors of said movable objects which have been read out; and memory module for generating a virtual image resulting from control of the behavior of said movable objects, wherein said memory means stores behaviors of said movable objects in the horizontal plane in said virtual space which have been associated with combinations of the signals that can be output by said plurality of input devices, as well as behaviors of said movable objects in the perpendicular direction.

18. A machine-readable memory medium that stores a movable objects behavior control program for controlling the behavior of movable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and memory module for controlling the behaviors of said movable objects in accordance with the behaviors of said movable objects which have been read out, wherein said memory means stores behaviors of said movable objects in the horizontal plane in said virtual space which have been associated with combinations of the signals that can be output by said plurality of input devices, as well as behaviors of said movable objects in the perpendicular direction.

19. A machine-readable memory medium that stores a virtual image generation program for generating virtual images of moveable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior;

memory module for controlling the behaviors of said movable objects in accordance with the behaviors of said movable objects which have been read out; and memory module for generating a virtual image resulting from control of the behavior of said movable objects, wherein said memory means stores behaviors specifying movement of said movable objects in the vertical direction in said virtual space when said plurality of input devices are in a prescribed control attitude.

20. A machine-readable memory medium that stores a virtual image generation program for generating virtual images of moveable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior;

memory module for controlling the behaviors of said movable objects in accordance with the behaviors of said movable objects which have been read out; and memory module for generating a virtual image resulting from control of the behavior of said movable objects, wherein said memory means stores behaviors specifying breaking said movable objects when said plurality of input devices are in a prescribed control attitude.

21. A machine-readable memory medium that stores a virtual image generation program for generating virtual images of moveable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior;

memory module for controlling the behaviors of said movable objects in accordance with the behaviors of said movable objects which have been read out; and memory module for generating a virtual image resulting from control of the behavior of said movable objects, wherein the memory module for reading out reads out behaviors of said movable objects in accordance with the signal combinations that have been acquired from said plurality of input devices when the same signal combination from the input devices is input a plurality of times.

22. A machine-readable memory medium that stores a movable objects behavior control program for controlling the behavior of movable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and memory module for controlling the behaviors of said movable objects in accordance with the behaviors of said movable objects which have been read out, wherein said memory means stores behaviors specifying movement of said movable objects in the vertical direction in said virtual space when said plurality of input devices are in a prescribed control attitude.

23. A machine-readable memory medium that stores a movable objects behavior control program for controlling the behavior of movable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and memory module for controlling the behaviors of said movable objects in accordance with the behaviors of said movable objects which have been read out, wherein said memory means stores behaviors specifying breaking said movable objects when said plurality of input devices are in a prescribed control attitude.

24. A machine-readable memory medium that stores a movable objects behavior control program for controlling the behavior of movable objects that move through a virtual space, comprising:

memory module for acquiring, from each of a plurality of input devices which are movable in a plurality of predetermined directions that coincide with an operator's instinctive sense, operational direction signals from the respective input devices which correspond to control attitude;

memory module for reading out, from memory means for storing predetermined various behaviors of said movable objects which have been coincided with combinations of operational directions of the input device that can be simultaneously output by said plurality of input devices, behaviors of said movable objects in accordance with the signal combinations that have been acquired from said plurality of input devices, wherein at least one behavior which moves in a different direction than that of the synthesis of the operational directions, included in the assigned combinations, is stored as said various behavior; and memory module for controlling the behaviors of said movable objects in accordance with the behaviors of said movable objects which have been read out, wherein the memory module for reading out reads out behaviors of said movable objects in accordance with the signal combinations that have been acquired from said plurality of input devices when the same signal combination from the input devices is input a plurality of times.

* * * * *

UNITED STATES PATENT AND TRADEMARK OFFICE
CERTIFICATE OF CORRECTION

PATENT NO. : 6,154,197
DATED : November 28, 2000
INVENTOR(S) : Juro Watari et al.

It is certified that error appears in the above-identified patent and that said Letters Patent is hereby corrected as shown below:

Colum 12, claim 6,
Line 35, "behavior," should read -- behavior; --.

Column 13, claim 9,
Line 65, after "read out", insert -- , -- (a comma).

Column 16, claim 15,
Line 7, after "input means", insert -- , -- (a comma).
Line 9, "operators" should read -- operator's --.

Column 16, claim 17,
Line 58, "moveable" should read -- movable --.

Column 17, claim 19,
Line 56, "moveable" should read -- movable --.

Column 18, claim 20,
Line 20, "moveable" should read -- movable --.

Column 18, claim 21,
Line 51, "moveable" should read -- movable --.

Signed and Sealed this

Twenty-sixth Day of March, 2002

Attest:

JAMES E. ROGAN
*Attesting Officer*     *Director of the United States Patent and Trademark Office*